(12) United States Patent
Kiriki

(10) Patent No.: US 11,413,718 B2
(45) Date of Patent: Aug. 16, 2022

(54) ROTATION INDEXING DEVICE

(71) Applicant: TSUDAKOMA KOGYO KABUSHIKI KAISHA, Ishikawa-ken (JP)

(72) Inventor: Masao Kiriki, Ishikawa-ken (JP)

(73) Assignee: TSUDAKOMA KOGYO KABUSHIKI KAISHA, Ishikawa-ken (JP)

( * ) Notice: Subject to any disclaimer, the term of this patent is extended or adjusted under 35 U.S.C. 154(b) by 101 days.

(21) Appl. No.: 17/101,653

(22) Filed: Nov. 23, 2020

(65) Prior Publication Data
US 2021/0162556 A1 Jun. 3, 2021

(30) Foreign Application Priority Data
Dec. 2, 2019 (JP) .............................. JP2019-217856

(51) Int. Cl.
*B23Q 16/10* (2006.01)
(52) U.S. Cl.
CPC .................................. *B23Q 16/10* (2013.01)
(58) Field of Classification Search
CPC ...... B23Q 16/10; B23Q 2703/04; B23Q 1/25; B23Q 1/28
See application file for complete search history.

(56) References Cited

U.S. PATENT DOCUMENTS 5,918,510 A * 7/1999 Uemura ............... B23Q 16/107
188/170

FOREIGN PATENT DOCUMENTS

| GB | 2315235 A | * | 1/1998 | ............... B23Q 1/28 |
| JP | H05-070838 U | | 9/1993 | |
| JP | H11-048063 A | | 2/1999 | |
| JP | 2002-018678 A | | 1/2002 | |
| JP | 2003-071667 A | | 3/2003 | |
| JP | 4913961 B2 | * | 4/2012 | ............... B23Q 1/52 |
| KR | 100543365 B1 | * | 1/2002 | |

OTHER PUBLICATIONS

May 11, 2021, European Search Report issued for related EP application No. 20209809.1.

* cited by examiner

*Primary Examiner* — Thomas C Diaz
(74) *Attorney, Agent, or Firm* — Paratus Law Group, PLLC

(57) ABSTRACT

The present invention provides a rotation indexing device where a shaft of a rotary joint is configured so that an outlet of a supply path opens to a lower surface of a flange part, a jig plate is formed to have a through-hole in which the flange part of the shaft is arranged and a flow path formed so that an inlet opens to a lower surface of the jig plate, and the jig plate is directly attached to a main shaft. Also, the rotation indexing device includes an adapter that is provided in contact with the flange part of the shaft and the jig plate and has a communication path for communicating the outlet of the supply path in the shaft and the inlet of the flow path in the jig plate each other.

2 Claims, 1 Drawing Sheet

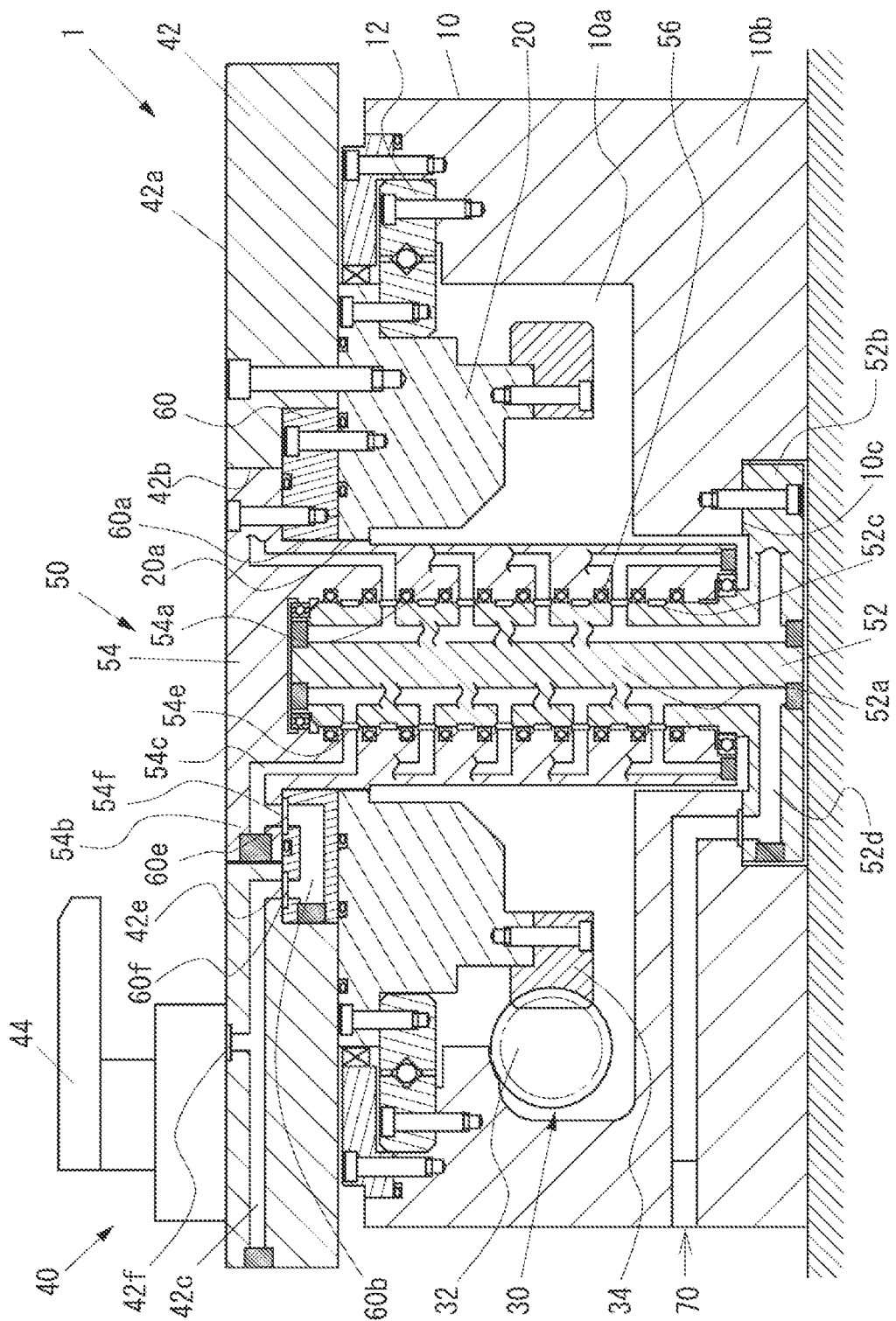

ROTATION INDEXING DEVICE

CROSS-REFERENCE TO RELATED APPLICATIONS

The present application claims priority from Japanese Patent Application No. 2019-217856, filed Dec. 2, 2019, the entire content of which is incorporated herein by reference.

BACKGROUND OF THE INVENTION

Field of the Invention

The present invention relates to a rotation indexing device including a main shaft rotatably received in a receiving hole of a frame, a rotary joint including a distributor fixedly arranged in the frame and a shaft fitted to the distributor and attached to the main shaft, and a jig unit including a jig plate configured to rotationally drive by the main shaft and having a flow path formed therein and a jig mounted on the jig plate so as to connect to an outlet of the flow path.

Background Art

For example, PTL 1 discloses a rotation indexing device that is used for a working machine. The rotation indexing device includes a support member (main shaft) received in a receiving hole of a frame and having a table (circular table) as a face plate attached to one end-side, and a drive mechanism configured to rotationally drive the main shaft, and is configured so that angular positions are indexed as the circular table and the main shaft are rotationally driven. In the rotation indexing device, a workpiece is placed on the circular table, and the workpiece is processed in a state where the angular positions are indexed as described above.

Although not disclosed in PTL 1, when placing the workpiece on the circular table of the rotation indexing device, a plurality of jigs such as a clamp device is used. A jig plate for mounting the jigs is generally used because it is less effective to mount each of the plurality of jigs on the circular table, in terms of workability. More specifically, a jig unit where the plurality of jigs is mounted in advance on the jig plate in arrangement suitable for a workpiece is prepared, and the jig unit is mounted on the circular table.

A pressure fluid is supplied to each jig on the jig plate mounted on the circular table, so that the workpiece is held on the jig plate (circular table). Also, regarding the supply of the pressure fluid, since the circular table (face plate) of the general rotation indexing device is not formed with a flow path, when the jig unit as described above is used, a plurality of flow paths corresponding to each of the jigs is provided in the jig plate and the pressure fluid is supplied to each jig via the flow paths.

Also disclosed in PTL 1, the rotation indexing device has a rotary joint provided in the frame. The rotary joint is provided so as to supply the pressure fluid to a device on the circular table. When the jig unit is mounted on the circular table, as described above, the pressure fluid is supplied to the jig unit via the rotary joint.

The rotary joint is configured by a distributor fixedly arranged in the frame and a shaft fitted to the distributor. Also, the shaft is attached to the circular table and is provided to the distributor so as to relatively rotate in conjunction with rotation of the circular table (main shaft). In the distributor and the shaft of the rotary joint, a plurality of flow paths is formed so as to supply the pressure fluid to the plurality of jigs. Also, the rotary joint is attached with a rotary seal (seal member) such as an O-ring in a form of being inserted and attached on an inner peripheral surface of the shaft, so as to prevent leakage of the pressure fluid between the plurality of flow paths between the distributor and the shaft.

CITATION LIST

Patent Literature

PTL 1: JP-A-2002-18678

SUMMARY OF THE INVENTION

By the way, it is necessary to periodically replace the seal member mounted on the shaft due to wear, aging degradation and the like. When replacing the seal member, an operation of detaching the shaft from the rotation indexing device is performed. Therefore, the rotation indexing device in PTL 1 is configured so as to detach the shaft from the rotation indexing device without detaching the table from the main shaft.

However, since the jig unit including the jig plate is mounted on the circular table of the rotation indexing device, as described above, it is necessary to detach the jig unit when detaching the shaft. Also, after replacing the seal member and returning the shaft to the rotation indexing device, it is necessary to again attach the jig unit to the circular table. However, at this time, it is necessary to adjust the jig unit. Accordingly, since the operation of replacing the seal member of the rotary joint of the rotation indexing device of the related art is accompanied by the operations of attaching and detaching the jig unit, considerable labor and time are consumed.

The present invention has been made keeping in mind the above problems, and an object thereof is to provide a configuration of a rotation indexing device configured to place a workpiece by using a jig unit, whereby it is not necessary to perform the operations of attaching and detaching the jig unit, which cause the problems as described above, when detaching the shaft from the rotation indexing device so as to replace the seal member of the rotary joint.

The present invention is based on a rotation indexing device including a main shaft rotatably received in a receiving hole of a frame, a rotary joint including a distributor fixedly arranged in the frame and a shaft fitted to the distributor and attached to the main shaft, and a jig unit including a jig plate configured to rotationally drive by the main shaft and having a flow path formed therein and a jig mounted on the jig plate so as to connect to an outlet of the flow path.

In order to achieve the above object, with respect to the rotation indexing device on which the present invention is based, the shaft has a body part fitted to the distributor and a flange part whose diameter is increased with respect to the body part on one end-side of the body part, and is configured so that an outlet of a supply path communicating with the distributor opens to a lower surface of the flange part, and the jig plate has a through-hole in which the flange part is arranged, an inner diameter of the through-hole being larger than an outer diameter of the flange part of the shaft, and is directly attached to the main shaft. Also, the flow path in the jig plate is formed so that an inlet opens to a lower surface of the jig plate. Also, the rotation indexing device of the present invention includes an adapter that has an insertion hole, in which the body part of the shaft is inserted, is arranged to be in contact with the lower surface of the flange part and the lower surface of the jig plate in a state where the body part is inserted in the insertion hole, and has a communication path for communicating the outlet of the supply path in the shaft and the inlet of the flow path in the jig plate each other.

Also, in the rotation indexing device in accordance with the present invention, the adapter may be fixed only to the main shaft within an existence range of the jig plate in a radial direction of the flange part.

According to the rotation indexing device of the present invention, the jig plate is directly attached to the main shaft in its attached state. That is, the rotation indexing device in accordance with the present invention has such a configuration that the jig plate is directly attached to the main shaft and a circular table is omitted, not the configuration of the rotation indexing device of the related art where the circular table is attached to the main shaft and the jig plate is mounted on the circular table. Also, the jig plate is formed to have the through-hole which has the inner diameter larger than the outer diameter of the flange part of the shaft and in which the flange part that is the largest diameter part of the shaft is arranged. Therefore, in the rotation indexing device, the flange part of the shaft is exposed to an outside even in a state where the jig plate is attached to the main shaft.

Thereby, it is possible to perform an operation of detaching the shaft from the rotation indexing device, in a state where the jig plate (jig unit) is attached to the main shaft. Therefore, even when performing an operation of detaching the shaft from the rotation indexing device so as to replace a seal member on a rotary joint, it is possible to perform the operation without detaching the jig unit, unlike the rotation indexing device of the related art, so that the above-described problems (a burden on an operator) accompanied by the attachment and detachment of the jig unit do not occur.

Also, according to the rotation indexing device of the present invention, the supply path for pressure fluid supply in the shaft is formed so that the outlet opens to the lower surface of the flange part, and the flow path in the jig plate is formed so that the inlet opens to the lower surface. Also, the rotation indexing device in accordance with the present invention is configured so that the outlet of the supply path in the shaft and the inlet of the flow path in the jig plate communicate with each other by the communication path of the adapter provided in contact with the lower surface of the flange part and the lower surface of the jig plate. According to this configuration, it is possible to prevent the rotation indexing device from being enlarged and the configuration of the flow path for supplying the pressure fluid to the jig from being complicated. This is specifically described as follows.

For example, in the rotation indexing device of PTL 1, a configuration is considered in which the circular table is formed therein with a flow path so as to cause the circular table to function similarly to the jig plate. When examining this configuration, based on the configuration disclosed in PTL 1, the outlet of the supply path is made to open to an outer peripheral surface of the flange part of the shaft of the rotary joint. However, according to this configuration, as described above, since the shaft is formed with the plurality of supply paths and the seal member for preventing the leakage of the pressure fluid between the flow paths is provided over the outer periphery of the flange part, the plurality of outlets is formed to open side by side in an axis line direction of the shaft on the outer peripheral surface of the flange part. For this reason, the dimension of the flange part is increased in the axis line direction, so that the rotation indexing device is enlarged.

Also, in order to avoid the enlargement, a configuration is also considered in which the outlet is made to open to an outer peripheral surface of the body part and the flow paths formed in the rotary joint (shaft) and the circular table are made to communicate with each other by a pipe body such as a hose. However, according to this configuration, since a plurality of pipe bodies is arranged in the frame, the configuration of the flow paths becomes complicated. Also, according to this configuration, since the pipe body connects to the shaft and the circular table and rotates together with the shaft and the circular table, it is necessary to secure a space for allowing piping and rotation in the frame. Therefore, even the configuration causes enlargement of the rotation indexing device.

In contrast, according to the rotation indexing device of the present invention, since the supply path of the shaft and the flow path of the jig plate are formed as described above and the flow path configuration of communicating the supply path and the flow path each other by using the adapter is adopted, each outlet of the supply path and each inlet of the flow path are formed side by side in a circumferential direction in each of the flange part of the shaft and the jig plate. Therefore, it is not necessary to increase a dimension of the flange part of the shaft in the axis line direction and a thickness dimension of the jig plate, and it is not also necessary to arrange the pipe body in the frame. Thereby, it is possible to prevent the rotation indexing device from being enlarged and the flow path configuration from being complicated.

Also, in the flow path configuration where the adapter as described above is used, the adapter is arranged overlapping the flange part of the shaft and the jig plate in the radial direction. Also, although the adapter is attached to the shaft and the jig plate so as not to be relatively rotatable, the attachment on the jig plate-side is made in a form of being fixed to the main shaft to which the jig plate is attached, rather than being fixed to the jig plate, so that it is possible to easily perform the replacement operation of the jig unit.

More specifically, the rotation indexing device has a configuration where the adaptor is arranged as described above so as to communicate the supply path of the shaft and the flow path of the jig plate each other. In this configuration, the adapter is usually directly fixed to the flange part of the shaft and the jig plate in which the supply path and the flow path made to communicate with each other are formed. Also, the fixing is generally performed using a screw member.

In the rotation indexing device, the jig unit corresponding to a workpiece to be processed is used. Therefore, when changing the workpiece to be processed, it is necessary to perform a replacement operation of replacing the jig unit with another jig unit corresponding to the changed workpiece. In the meantime, according to the present invention, as described above, the jig plate is directly attached to the main shaft. Therefore, during the replacement operation, it is necessary to release at least a fixed state between the jig plate and the main shaft (it is necessary to detach the screw member by which the jig plate is fixed to the main shaft). Also, the adapter is fixed to the shaft on the rotary joint-side. Also, when the adapter is fixed to the jig plate on the jig plate-side, as described above, an operator should perform an operation of detaching the screw member by which the jig plate and the adapter are fixed to each other, during the replacement operation.

In contrast, according to the above configuration where the attachment of the adapter on the jig plate-side is made in a form of being fixed to the main shaft, it is possible to detach the jig unit simply by detaching the screw member by which the jig plate and the main shaft are fixed to each other, during the replacement operation. Thereby, it is possible to easily perform the replacement operation for changing the jig unit in association with the change of the workpiece.

BRIEF DESCRIPTION OF THE DRAWING

FIGURE is a side sectional view showing an embodiment of a rotation indexing device in accordance with the present invention.

DETAILED DESCRIPTION OF THE INVENTION

Hereinafter, an embodiment of a rotation indexing device in accordance with the present invention will be described with reference to the drawing.

The rotation indexing device 1 includes, as constitutional elements, a frame 10 that is mounted to a working machine and the like, a main shaft 20 to which a jig unit 40 is attached, and a drive mechanism 30 configured to rotationally drive the main shaft 20. Among them, the frame 10 has therein a receiving hole 10a in which the main shaft 20, a drive transmission unit of the drive mechanism 30 and the like are arranged. The main shaft 20 is supported to the frame 10 so as to be rotatable in a form of being supported to the frame 10 via a bearing 12 in the receiving hole 10a.

The receiving hole 10a is formed as a through-hole penetrating in an axis line direction of the main shaft 20 arranged therein. In the meantime, the frame 10 has a base part 10b, which is a part to be placed on a working machine and the like, and the receiving hole 10a is formed so that a diameter thereof is reduced at the base part 10b. The main shaft 20 is provided so that an end face on one end-side in an axis line direction thereof is exposed to the frame 10 and the other end-side is positioned in the frame 10 (receiving hole 10a).

In the present embodiment, the drive mechanism 30 uses a worm gear mechanism, and includes a drive motor (not shown), and a worm spindle 32 and a worm wheel 34 as the drive transmission unit. The worm wheel 34 is fixed to the other end-side of the main shaft 20 so as not to be relatively rotatable, in the receiving hole 10a of the frame 10. Also, the worm spindle 32 is provided to be coupled to an output shaft of the drive motor and to be meshed with the worm wheel 34. Therefore, when the worm spindle 32 is rotationally driven by the drive motor, the main shaft 20 is rotationally driven via the worm wheel 34.

The rotation indexing device 1 in accordance with the present invention is provided with the jig unit 40 in a form of being directly attached to the main shaft 20. The jig unit 40 includes a jig plate 42 that is directly attached to the main shaft 20, and a jig 44 that is arranged on the jig plate 42.

The jig unit 40, more specifically, the jig plate 42 that is a disc-shaped member is fixed to the main shaft 20 so as not to be relatively rotatable in a state where one of both end faces of the jig plate in a thickness direction is in contact with the end face on the one end-side of the main shaft 20. The fixing is made by screwing, to the main shaft 20, a plurality of screw members inserted in the jig plate 42 in the thickness direction. Also, in the fixed state, as seen from above, a center of the jig plate 42 coincides with a shaft center of the main shaft 20. The jig plate 42 is attached to the main shaft 20, as described above, so that an end face of the jig plate 42 on an opposite side to the main shaft 20 becomes a mounting surface 42a on which the jig 44 and the like are mounted and the workpiece is placed.

The jig 44 is to hold a workpiece to be processed, and a clamp device or the like is used as the jig 44. The jig 44 is placed on the mounting surface 42a of the jig plate 42, in the number (type) and arrangement conforming to a shape and the like of the workpiece, and is fixed to the jig plate 42 by an appropriate fixing means (not shown). In the meantime, the jig 44 such as a clamp device is operated by a pressure fluid 70. Therefore, the jig plate 42 is formed therein with a flow path 42c for supplying the pressure fluid 70 to the jig 44. The flow path 42c is formed so that an outlet 42f opens to the mounting surface 42a in a position corresponding to a mounting position of the jig 44. The jig 44 is mounted on the jig plate 42 in a state where a supply port of the pressure fluid 70 communicates with the outlet 42f of the flow path 42c in the jig plate 42.

Also, the rotation indexing device 1 includes a rotary joint 50 for supplying the pressure fluid 70 to the jig 44 via the flow path 42c of the jig plate 42. The rotary joint 50 includes a circular column-shaped distributor 52 fixed to the frame 10, and a cylindrical shaft 54 fitted to the distributor 52 so as to be relatively rotatable and configured to rotate together with the main shaft 20. The rotary joint 50 is provided to exist from the base part 10b of the frame 10 to the jig plate 42 in an axis line direction thereof, in a state where the axis line coincides with the axis line of the main shaft 20. Therefore, the main shaft 20 has an insertion hole 20a (in which the rotary joint 50 is inserted) allowing such arrangement of the rotary joint 50. The jig plate 42 of the jig unit 40 is also formed with a hole allowing such arrangement of the rotary joint 50 (which will be described in detail later).

The rotary joint 50, more specifically, the distributor 52 has, as a main body, a shaft part 52a to which the shaft 54 is fitted, and one end-side of the shaft part 52a is provided with a flange part 52b having a diameter larger than the shaft part 52a. The distributor 52 is fixed at the flange part 52b to the base part 10b of the frame 10. Therefore, a portion (penetration portion) of the receiving hole 10a of the frame 10 penetrating the base part 10b is formed so that an outer portion has an inner diameter corresponding to an outer diameter of the flange part 52b of the distributor 52 and the other portion has an inner diameter smaller than the outer portion. That is, the penetration portion of the receiving hole 10a is formed so that the inner diameter changes on the way in a penetration direction. Therefore, the base part 10b has a surface directed outward in the penetration portion, and the surface is an attachment surface 10c for attaching the distributor 52 to the frame 10.

Also, the distributor 52 is fixed to the frame 10 in a state where one end face of the flange part 52b is in contact with the attachment surface 10c of the base part 10b in a direction in which the shaft part 52a is positioned on the receiving hole 10a-side of the frame 10. In the meantime, the fixing is performed by screwing, to the frame 10, a plurality of screw members inserted in the flange part 52b in a thickness direction thereof. Also, the shaft part 52a of the distributor 52 has a length dimension in the axis line direction at which an end face thereof is positioned in the hole formed in the jig plate 42, in a state where the distributor 52 is fixed to the frame 10 as described above. In other words, the end face of the shaft part 52a is positioned in the hole formed in the jig plate 42, in the state where the distributor 52 is fixed to the frame 10.

Also, the shaft 54 has a cylindrical body part 54a having one closed end-side and fitted to the shaft part 52a of the distributor 52, and a flange part 54b having a diameter larger than an outer diameter of the body part 54a and formed on the one end-side of the body part 54a. The shaft 54 of the rotary joint 50 is fitted to the shaft part 52a of the distributor 52 so as to be relatively rotatable. Also, the shaft 54 has such a dimension in the axis line direction that a position of an end face substantially coincides with a position of the mounting surface 42a of the jig plate 42, in a state where the shaft 54 is fitted to the distributor 52 fixed to the frame 10. Therefore, the flange part 54b of the shaft 54 is positioned (arranged) in the hole formed in the jig plate 42 in the state where the shaft 54 is fitted to the distributor 52.

In the meantime, the hole formed in the jig plate 42 is an attachment hole 42b for attaching the flange part 54b (shaft 54) to the main shaft 20 fixed to the jig plate 42 with the flange part 54b being arranged therein, and is also the attachment hole 42b as the through-hole of the present invention. Also, the attachment hole 42b is formed so that an inner diameter changes at a substantially central portion in the thickness direction of the jig plate 42, and is formed as a hole where an inner diameter of a portion on the main shaft 20-side is larger than an inner diameter of a portion on the mounting surface 42a-side. Therefore, the jig plate 42 is formed so that a thickness dimension of a part (an inner part) on an inner periphery-side is smaller than the other part (an outer periphery-side).

Also, the flange part 54b of the shaft 54 is formed so that an outer diameter is substantially the same as the inner diameter of the portion of the attachment hole 42b on the mounting surface 42a-side. Also, the flange part 54b is formed so that a thickness dimension is substantially the same as a thickness dimension of the inner part of the jig plate 42. Thereby, in the state where the shaft 54 is fitted to the distributor 52, an outer peripheral surface of the flange part 54b is in contact with an inner peripheral surface (the portion of the attachment hole 42b on the mounting surface 42a-side) of the inner part of the jig plate 42 in a state where an end face of the flange part is substantially flush with the mounting surface 42a of the jig plate 42.

The rotary joint 50 configured as described above is to provide the pressure fluid 70 to the jig unit 40, as described above. Therefore, the rotary joint has flow paths corresponding to the number of the jigs 44 that are a supply target of the pressure fluid 70. More specifically, the distributor 52 has a plurality of grooves 52c formed in an outer peripheral surface thereof with equal intervals in the axis line direction, and a plurality of flow paths 52d provided in different positions in the circumferential direction and formed to communicate with (to open to) the different grooves 52c. In the meantime, the pressure fluid 70 is supplied to each of the flow paths 52d formed in the distributor 52, via flow paths formed in the frame 10.

Also, the shaft 54 has a plurality of supply paths 54c provided so as to supply the pressure fluid 70 to the jig unit 40 and formed in different positions in the circumferential direction. The supply paths 54c are formed so that inlets 54e thereof open to an inner peripheral surface of the body part 54a and each communicates with each of the grooves 52c. Also, each of the supply paths 54c is formed to extend in a radial direction toward the flange part 54b on the one end-side of the shaft 54. In the meantime, on the inner peripheral surface of the body part 54a of the shaft 54, seal members 56 for preventing leakage of the pressure fluid 70 are inserted and fitted in positions of both sides of the grooves 52c in the axis line direction in the state where the shaft 54 is fitted to the distributor 52.

In the rotation indexing device 1 configured as described above, according to the present invention, each of the supply paths 54c formed in the shaft 54 as described above is formed so that an outlet 54f opens to a lower surface of the flange part 54b (not a circumferential surface of the shaft 54 (flange part 54b)). Therefore, in the flange part 54b, a portion of each supply path 54c on the outlet 54f-side is formed to extend from the portion extending in the radial direction as described above toward the lower surface-side, and the outlets 54f open to the lower surface in different positions in the circumferential direction.

Also, the jig plate 42 is formed therein with a plurality of the flow paths 42c for supplying the pressure fluid 70 to the jigs 44, in a form corresponding to the jigs 44. Each of the flow paths 42c is formed so that an inlet 42e opens to the lower surface of the jig plate 42. More specifically, as described above, the jig plate 42 has the inner peripheral part whose thickness dimension is smaller than the other part, on the inner periphery-side. Each of the flow paths 42c is formed so that the inlet 42e opens to the lower surface (a surface opposite to the mounting surface 42a in the thickness direction) of the inner peripheral part of the jig plate 42. In the meantime, the inlets 42e of the respective flow paths 42c are also formed in different positions in the circumferential direction on the lower surface of the jig plate 42 (inner peripheral part).

Also, the rotation indexing device 1 in accordance with the present invention includes an adapter 60 having a communication path 60b for communicating the outlet 54f of the supply path 54c of the shaft 54 and the inlet 42e of the flow path 42c of the jig plate 42 each other. The adapter 60 is described more specifically, as follows.

The adapter 60 is a disc-shaped member having a hole (central hole 60a) formed at the center. The central hole 60a is formed so that an inner diameter is substantially the same as the outer diameter of the body part 54a of the shaft 54, so as to arrange the body part 54a of the shaft 54 in the central hole. Also, the adapter 60 is formed so that an outer diameter is substantially the same as the inner diameter of the portion, on the main shaft 20-side, of the attachment hole 42b of the jig plate 42 (inner peripheral part) and a thickness dimension is substantially the same as a dimension between the lower surface of the inner peripheral part of the jig plate 42 and the lower surface of the jig plate.

In the rotation indexing device 1 of the present embodiment, the thickness dimension of the jig plate 42 is different between the inner peripheral part and the outer peripheral part, as described above. Therefore, the attachment hole 42b of the jig plate 42 in which the flange part 54b of the shaft 54 is arranged is formed so that an inner diameter of a portion closer to the main shaft 20-side than the central portion, is larger than a portion on the mounting surface 42a-side. The thickness dimension of the inner peripheral part of the jig plate 42 coincides with the thickness dimension of the flange part 54b, so that a space surrounded by the lower surfaces of the flange part 54b and the inner peripheral part, the outer peripheral surface of the body part 54a and the inner peripheral surface of the attachment hole 42b exists between the jig plate 42 and the shaft 54.

The adapter 60 is arranged in the space surrounded by the jig plate 42 and the shaft 54. Specifically, in the rotation indexing device 1, in the state where the body part 54a of the shaft 54 is inserted in the central hole 60a, the adapter 60 is arranged in the space in a state where an end face on one end-side in a thickness direction thereof is in contact with the lower surface of the flange part 54b and the lower surface of the inner peripheral part of the jig plate 42 and an outer peripheral surface is in contact with the inner peripheral surface of the portion of the attachment hole 42b of the jig plate 42 on the main shaft 20-side. The adapter 60 is fixedly provided to the shaft 54 and the jig plate 42 so as not to be relatively rotatable.

Regarding the fixing, the shaft 54 and the adapter 60 are fixed therebetween by screwing, to the adapter 60, a plurality of screw members inserted into the flange part 54b of the shaft 54 in the thickness direction in different positions in the circumferential direction.

Also, regarding the fixing between the adapter 60 and the jig plate 42, as described above, the jig plate 42 is attached to the main shaft 20 in the state where the jig plate is in contact with the end face on the one end-side of the main shaft 20. Also, the inner diameter of the insertion hole 20a of the main shaft 20 is substantially the same as the outer diameter of the body part 54a of the shaft 54, like the central hole 60a of the adapter 60. Also, as described above, the thickness dimension of the adapter 60 is substantially the same as the dimension between the lower surface of the inner peripheral part of the jig plate 42 and the lower surface of the jig plate. Therefore, in the state where the adapter 60 is arranged in the space, the adapter 60 is in contact with the end face on the one end-side of the main shaft 20.

Also, the adapter 60 is fixed to the main shaft 20 by screwing, to the main shaft 20, the plurality of screw members inserted in the adapter 60 in the thickness direction in different positions in the circumferential direction. Since the jig plate 42 is fixed to the main shaft 20 so as not to be relatively rotatable, as described above, the adapter 60 is fixed to the jig plate 42 via the main shaft 20 so as not to be relatively rotatable. In this way, according to the present embodiment, the adapter 60 is fixed to the jig plate 42 but the fixing is indirectly made via the main shaft 20 and the adapter is directly fixed only to the main shaft 20 within an existence range of the jig plate 42 in the radial direction.

Also, the adapter 60 is formed with a plurality of the communication paths 60b for supplying the pressure fluid 70 to the jig unit 40, which are provided in different positions in the circumferential direction and are formed to extend radially from the inner peripheral part toward the outer peripheral part. Each of the communication paths 60b is formed so that an inlet 60e and an outlet 60f thereof open to the end face on the one end-side (an end face in contact with the flange part 54b of the shaft 54 and the jig plate 42) so as to communicate with the outlet 54f of the supply path 54c of the shaft 54 and the inlet 42e of the flow path 42c of the jig plate 42. Therefore, each of the communication paths 60b is formed so that portions on the inlet 60e-side and the outlet 60f-side extend in the thickness direction of the adapter 60 from the radially extending portion as described above toward the end face on the one end-side.

In the rotation indexing device 1 configured as described above, the adapter 60 is first fixed and attached to the main shaft 20, as described above, and the shaft 54 of the rotary joint 50 is then inserted into the receiving hole 10a of the frame 10 in a form of being inserted into the central hole 60a of the adapter 60 and the insertion hole 20a of the main shaft 20. In this state, the adapter 60 and the shaft 54 are fixed to each other, as described above, so that the shaft 54 is attached in the rotation indexing device 1. Also, the jig plate 42 is combined in a form where the flange part 54b of the shaft 54 and the adapter 60 are fitted in the attachment hole 42b, and in this state, the jig plate 42 and the main shaft 20 are fixed to each other, as described above, so that the jig unit 40 is attached in the rotation indexing device 1.

The rotation indexing device 1 of the present embodiment has such a configuration that the adapter 60, the shaft 54 of the rotary joint 50 and the jig unit 40 are combined in this way. In the meantime, as described above, since the outer diameter of the flange part 54b of the shaft 54 is substantially the same as the inner diameter of the portion of the attachment hole 42b of the jig plate 42 on the mounting surface 42a-side, the flange part 54b of the shaft 54 is arranged in the attachment hole 42b of the jig plate 42 and the shaft 54 and the jig plate 42 do not overlap each other in the radial direction, as seen from above, in the state where the shaft 54 and the jig plate 42 are attached as described above. Therefore, according to the rotation indexing device 1 configured as described above, the shaft 54 can be detached simply by detaching the screw members fixing the adapter 60 and the shaft 54 each other, without detaching the jig unit 40 from the main shaft 20.

Also, as described above, the adapter 60 is directly fixed only to the main shaft 20 within the existence range of the jig plate 42 in the radial direction, i.e., within a range in which the adapter 60 and the jig plate 42 overlap each other in the radial direction. In other words, in this configuration, the adapter 60 and the jig plate 42 are not directly fixed to each other, and the screw member for the fixing and the like do not exist. Therefore, according to this configuration, the jig unit 40 can be detached simply by detaching the screw members fixing the jig plate 42 and the main shaft 20 each other.

In the above, the embodiment (hereinbelow, referred to as "the above-described embodiment") of the rotation indexing device to which the present invention is applied has been described. However, the present invention is not limited to the above-described embodiment, and can also be implemented by other embodiments (modified embodiments) as described below.

(1) In the above embodiment, the space is formed by the jig plate 42 and the shaft 54, and the adapter 60 is arranged in the space. The space is formed by forming the attachment hole 42b in the jig plate 42 as described above and setting the thickness dimension of the flange part 54b of the shaft 54 to be substantially the same as the thickness dimension of the inner peripheral part of the jig plate 42. However, in the present invention, the flange part of the shaft and the jig plate are not limited to the above-described embodiment.

For example, the thickness dimension of the inner peripheral part of the jig plate and the thickness dimension of the flange part of the shaft may be formed to be different from each other. In this case, the lower surfaces of the flange part and the jig plate, which form a surface of the space facing the main shaft, exist in different positions in the axis line direction. Therefore, in this case, the adapter is formed so that the end face on the one end-side has a step portion capable of contacting the lower surfaces of the flange part and the jig plate.

Also, the attachment hole of the jig plate is not limited to the hole whose diameter changes at the substantially central portion, like the above-described embodiment, and may also be formed as a hole whose diameter is equal over the plate thickness direction. In this case, the thickness dimension of the flange part of the shaft may be substantially the same as or different from the thickness dimension of the jig plate. In the former case, the adapter may be the same as the above-described embodiment, in terms of the shape. However, regarding the arrangement with respect to the jig plate, the adapter is in contact with the jig plate in a position in which it does not overlap the jig plate in the plate thickness direction of the jig plate. Also, in the latter case, the adapter is the same as the former case, in terms of the arrangement with respect to the jig plate, and has the shape where the end face on the one end-side has a step portion, similarly to the above-described embodiment.

(2) In the configuration for implementing the fixed state of the adapter 60 to the jig plate 42, in the above embodiment, the adapter 60 is (directly) fixed to the main shaft 20 to which the jig plate 42 is fixed, by the screw members, and is indirectly fixed to the jig plate 42. However, regarding the configuration of fixing the adapter to the jig plate, the present invention is not limited to the above-described embodiment. For example, the adapter may be directly fixed to the jig plate, not to the main shaft.

Also, the present invention is not limited to the above-described embodiment and can be diversely changed without departing from the gist of the present invention.

What is claimed is:

1. A rotation indexing device comprising a main shaft rotatably received in a receiving hole of a frame, a rotary joint comprising a distributor fixedly arranged in the frame and a shaft fitted to the distributor and attached to the main shaft, and a jig unit comprising a jig plate configured to rotationally drive by the main shaft and having a flow path formed therein and a jig mounted on the jig plate so as to connect to an outlet of the flow path, wherein the shaft has a body part fitted to the distributor and a flange part whose diameter is increased with respect to the body part on one end-side of the body part, and is configured so that an outlet of a supply path communicating with the distributor opens to a lower surface of the flange part, wherein the jig plate has a through-hole in which the flange part is arranged, an inner diameter of the through-hole being larger than an outer diameter of the flange part of the shaft, and is directly attached to the main shaft, and the flow path is formed so that an inlet opens to a lower surface of the jig plate, and wherein the rotation indexing device comprises an adapter that has an insertion hole, in which the body part of the shaft is inserted, is arranged to be in contact with the lower surface of the flange part and the lower surface of the jig plate in a state where the body part is inserted in the insertion hole, and has a communication path for communicating the outlet of the supply path in the shaft and the inlet of the flow path in the jig plate each other.

2. The rotation indexing device according to claim 1, wherein the adapter is fixed only to the main shaft within an existence range of the jig plate in a radial direction of the flange part.

* * * * *